(12) United States Patent
Anaya et al.

(10) Patent No.: US 10,128,792 B2
(45) Date of Patent: Nov. 13, 2018

(54) TEMPERATURE CONTROLLED PLATFORM, SYSTEM, AND METHOD FOR HOLDING, PROBING, AND TESTING SOLAR CELLS

(71) Applicant: The Boeing Company, Chicago, IL (US)

(72) Inventors: Ricardo Anaya, Pasadena, CA (US); Dale H. Waterman, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 300 days.

(21) Appl. No.: 15/211,404

(22) Filed: Jul. 15, 2016

(65) Prior Publication Data

US 2017/0149381 A1 May 25, 2017

Related U.S. Application Data

(60) Provisional application No. 62/260,191, filed on Nov. 25, 2015.

(51) Int. Cl.
*G01R 31/26* (2014.01)
*H01L 21/00* (2006.01)
*H02S 50/10* (2014.01)

(52) U.S. Cl.
CPC .................................. *H02S 50/10* (2014.12)

(58) Field of Classification Search
CPC ........................................................ H02S 50/10
USPC ........................................ 324/761.01; 438/98
See application file for complete search history.

(56) References Cited

U.S. PATENT DOCUMENTS

2011/0279141 A1* 11/2011 Wang et al. ........... G01R 31/26
324/761.01

* cited by examiner

*Primary Examiner* — Farhana Hoque
(74) *Attorney, Agent, or Firm* — Vivacqua Law (57) ABSTRACT

A system for testing solar cells includes a probe plate portion, a first voltage probe tip, a first current probe tip, at least one second voltage probe tip, at least one second current probe tip, and means for vertical actuation of the first voltage probe tip to contact the solar cell underside and vertical actuation of the at least one second voltage probe tip and at least one second current probe tip to contact a solar cell top surface. The probe plate portion includes a conductive top surface configured for contact with a solar cell underside and the first current probe tip, a first and a second series of vacuum ports disposed on the conductive top surface, and a coolant channel. The second series of vacuum ports covers a larger area of the conductive top surface than the area covered by the first series of vacuum ports.

20 Claims, 13 Drawing Sheets

TEMPERATURE CONTROLLED PLATFORM, SYSTEM, AND METHOD FOR HOLDING, PROBING, AND TESTING SOLAR CELLS

TECHNICAL FIELD

The present application is directed to the testing of solar cells and, more particularly, to a system and method for flexible testing of photovoltaic solar cells.

BACKGROUND

Solar cells, for example photovoltaic cells (PVCs), have been used for many years to generate electrical energy from sunlight. Hereafter, the terms "solar cells" and "PVCs" will be used interchangeably and refer to cells that generate electrical power from exposure to light. Solar panels, which typically include many individual cells, have been deployed in space and terrestrial applications.

Terrestrial photovoltaic cells may be exposed to "multiple" sun sources using mirrors, reflectors, and/or lenses that concentrate sunlight into a smaller area, which results in higher radiation energy per square unit of area. Such concentration is desirable to generate higher current per cell. This concentrated level of energy generates high levels of heat that places stresses on the internal structures of the PVC as well as electrical connections and mechanical attachment points. Temperature gradients often develop between adjacent portions of the PVC.

Over time, these elevated temperatures and temperature gradients degrade the performance of PVCs and can trigger failures in the PVC, electrical connections or mechanical attachment points. Understanding the conditions under which PVCs fail enables engineers to develop solutions to mediate design problems within the PVCs and associated structures. Stress testing can assist engineering in developing failure rate metrics useful for system integrators that use PVCs in commercial applications.

Accordingly, test equipment and technologies for terrestrial photovoltaic cells are designed to test PVCs not only by approximating the incident light and environmental conditions likely to be seen by the PVCs, but also by thermally stressing the PVCs to determine the long term effects of thermal stresses on the PVCs. These methods can involve creating higher thermal stresses and sharper temperature gradients than typically would be seen in commercial applications. Creating these thermal stresses allow characterization of the PVCs in comparatively shorter periods of time.

Recreating the thermal stresses on the PVC can be accomplished in various ways. Current tests include exposing the PVCs to concentrated sunlight for extended periods of time, placing PVCs in thermal cycling chambers to simulate different thermal conditions, and applying electrical currents to stress the PVCs and electrical connections.

Many thermal tests take comparatively long periods of time to perform. Thermal test methods include placing the PVC to be tested in a controlled temperature environment, such as a thermal cycle chamber where inside the chamber the ambient temperature can be controlled. The ambient temperature is then cycled to different temperatures for varying periods of time, and then the performance of the PVC is measured to determine how the PVC was affected. Generally, it takes some time for all the components to equalize with the internal ambient temperature using a thermal cycle chamber, and therefore cycle times for some tests can be fairly long, lasting from minutes to hours for each cycle.

Moreover, thermal cycle chambers typically are not representative of operating conditions in the field. Thermal cycle chambers convectively heat or cool the PVCs test samples evenly over a relatively long period of time. In contrast, the field temperature stresses typically occur much faster. Also the distribution of heat in the field will generally tend to be non-uniform across the entire PVC assembly. For example, in a thermal cycle chamber, the temperature typically is consistent from the front to the rear of the solar cell and at the mechanical and electrical interconnections. In the field, however, sunlight heats the front of the PVC whereas the rear of the PVC is typically attached to a heat sink structure, creating a temperature gradient from the front of the PVC to the rear of the PVC. Also, in the field, the mechanical and electrical connections often receive relatively little or no heating from sunlight, but considerable heating from convection, heat conduction, or electrical current passing through them.

Another thermal test method is the dark forward thermal cycle. Often performed in a thermal cycle chamber, the dark forward thermal cycle involves forward biasing the PVC to generate current through the PVC. The generated current simulates approximately the amount of current that would be produced by illuminating the PVC with sunlight. Using the dark forward thermal cycle method, it is also possible to force more current through the PVC than would be possible using illumination alone.

Each of these test methods requires the application of a unique set of parameters, to a multitude of variously sized PVCs, all with a consistent application of the testing parameters to ensure reliability and accuracy. More specifically, many of the previously practiced test methods resulted in damage to a large number of tested PVCs as a result of using threaded vacuum ports (having metal burrs stick into the PVC) and using blade probes (causing scrub and damage to the PVC when probing). Heretofore, transitioning between tests of different sized PVCs required varying degrees of system reconfiguration that was time consuming, inefficient, and damaged the PVCs.

Advantages over the prior art are herewith provided in the following disclosure.

SUMMARY

The disclosure describes a safe, reliable, and efficient temperature controlled system for holding, probing, and testing solar cells. In one example, a platform for testing solar cells includes a probe plate portion, a first voltage probe tip, a first current probe tip, at least one second voltage probe tip, at least one second current probe tip, and a vertical actuator for causing the first voltage probe tip to contact the solar cell underside and the at least one second voltage probe tip and at least one second current probe tip to contact a solar cell top surface. The probe plate portion includes a conductive top surface configured to contact a solar cell underside and the first current probe tip, a first and a second series of vacuum ports disposed on the conductive top surface, and a coolant channel. The second series of vacuum ports cover a larger area of the conductive top surface than the area covered by the first series of vacuum ports.

In another example, a method for testing a solar cell includes placing a solar cell onto a conductive top surface of a probe plate of a platform, monitoring pressure on a series of vacuum ports on the conductive top surface of the probe plate, providing vacuum only to a subset of the series of vacuum ports which are covered by the solar cell, regulating temperature in the probe plate by flowing a coolant through a coolant channel in the probe plate, and probing the solar cell. Probing the solar cell includes vertically actuating a probe card of the platform so that at least two pairs of probes contact the solar cell, measuring for a continuity of the at least one pair of probes to ensure electrical connection to the solar cell, exposing the solar cell to a light source, and routing current and voltage signals from the at least two pairs of probes to a source meter to perform a Kelvin measurement of the solar cell.

In yet another example, a method for making a solar cell test system includes forming a platform with a probe plate having a conductive top surface shaped to receive a solar cell thereon, forming a series of vacuum ports on the conductive top surface for monitoring pressure, programming a controller to provide a vacuum only to a subset of the series of vacuum ports that are covered by the solar cell, and programming the controller to regulate temperature in the probe plate by flowing a coolant through a coolant channel formed in the probe plate and to probe the solar cell. Programming the controller to probe the solar cell including vertically actuating a probe card of the platform so that at least two pairs of probes contact the solar cell, measuring for a continuity of the at least one pair of probes to ensure electrical connection to the solar cell, exposing the solar cell to a light source, and routing current and voltage signals from the at least two pairs of probes to a source meter to perform a Kelvin measurement of the solar cell.

Other aspects and advantages of the disclosed temperature controlled platform for holding, probing, and testing solar cells will be apparent from the following description, the accompanying drawings, and the appended claims.

BRIEF DESCRIPTION OF THE DRAWINGS

The concurrently filed figures represent various perspectives (e.g., from above, below, side views, individual component views, combined system views) of one example of the present disclosure. A person of ordinary skill in the art would understand that the specific components depicted in these figures are only representative and are not limiting. As such, the present disclosure does not lie in any single component, but rather in the collection of components described in their specific arrangement described. And a person of ordinary skill would understand the present disclosure to teach the disclosure described as well as those examples that replace certain disclosed components for components that serve similar purposes and will not disturb the novel features of the present disclosure.

DETAILED DESCRIPTION

The disclosed photovoltaic cells (hereinafter "PVC") testing system and method utilizes platforms configured to secure PVCs of varying sizes for safe, reliable, and efficient testing. When a PVC is introduced to the system for testing, the system automatically provides vacuum only to ports covered by the PVC, and the system may flexibly apply electrical contacts to the PVC's electrical contacts. This type of PVC testing provides for a more efficient transitioning between tests of different sized PVCs, without the need to change or modify the equipment between different PVC test as required by prior art systems. While the following discussion describes various examples of the disclosed system and method as automatically adaptable to PVCs of many shapes and sizes, it is to be understood that the platform of the present disclosure may comprise interchangeable probe plates and/or interchangeable probe cards, such that the disclosed system and method is compatible with a variety of PVCs with minimal degrees of manual reconfiguration.

Figure 1:
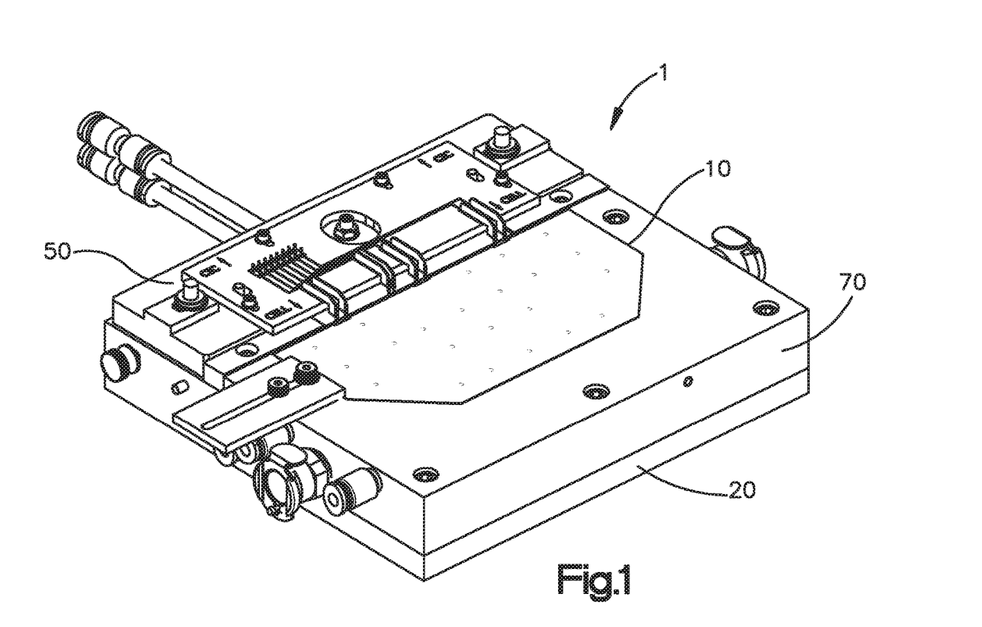
FIG. 1 is a top perspective view of one example of the disclosed temperature controlled platform for holding, probing, and testing solar cells.
Figure 2:
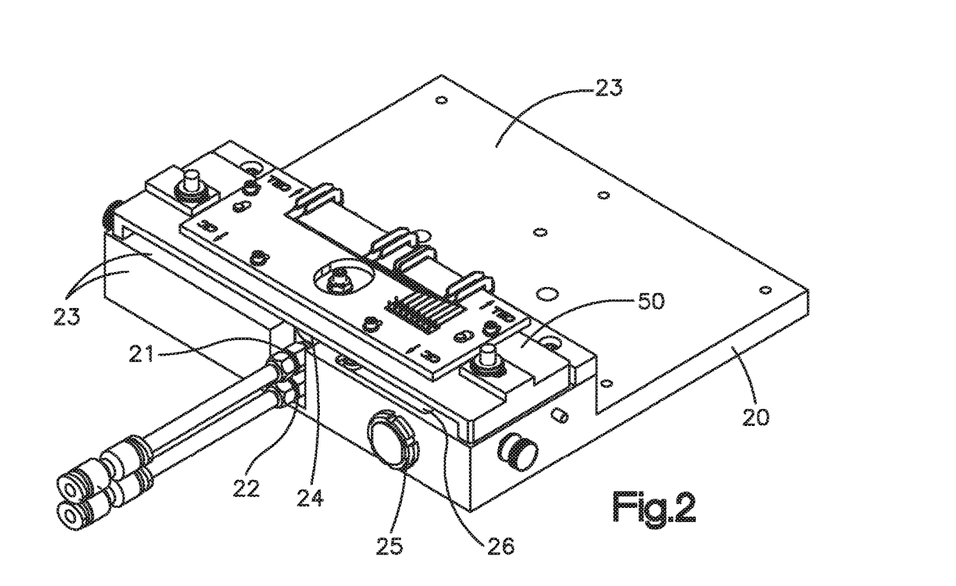
FIG. 2 is a top perspective view of a subassembly of the platform of FIG. 1, with the modular probe plate portion removed.

As shown in FIG. 1, an example of the disclosed temperature controlled platform, generally designated 1, for holding, probing, and testing solar cells is shown receiving a solar cell 10. The platform 1 includes a base 20, a probe card 50, and a probe plate 70. The base 20, as shown in FIG. 2, includes a first pressure port 21, a second pressure port 22, and a base connector port 25, all three disposed on the exterior of the base 20. A pneumatic vertical actuator 24 in FIG. 2 is in fluid communication with both the first pressure port 21 and the second pressure port 22, whereby changes in the relative pressure between the first pressure port 21 and the second pressure port 22 effect movement of the pneumatic vertical actuator 24. The functionality of the pneumatic vertical actuator 24 can be carried out by various means of actuation, such as by an electric motor driven screw-type drive, a spring-biased capacitive connection, or a pneumatic vertical actuator pancake ram air device like the model PSD1-0-125 double-action pancake actuator available from Fabco-Air, Inc., of Gainesville, Fla.

Figure 3A:
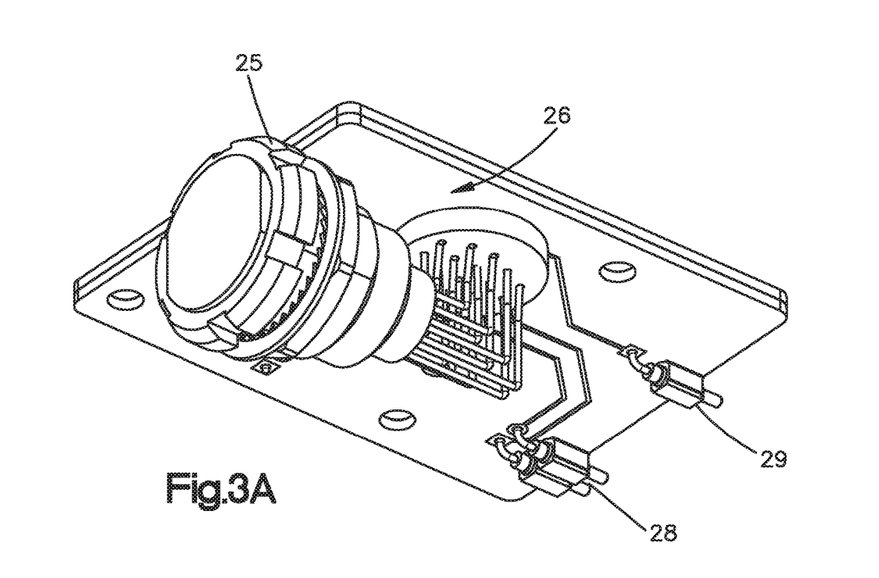
FIGS. 3A and 3B are bottom perspective views of a base printed circuit board connected to a base connector port of the platform of FIG. 1.
Figure 3B:
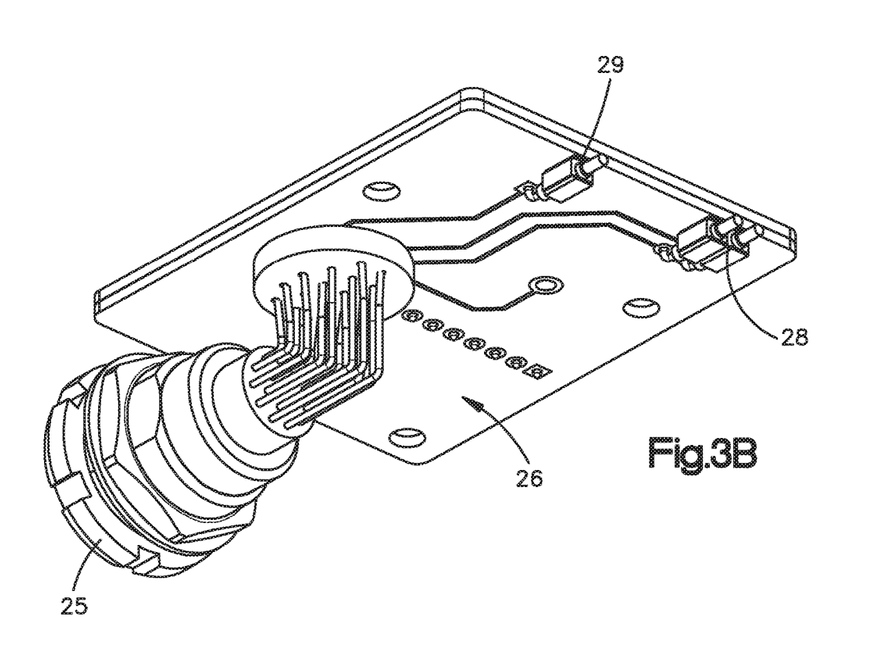
Figure 3C:
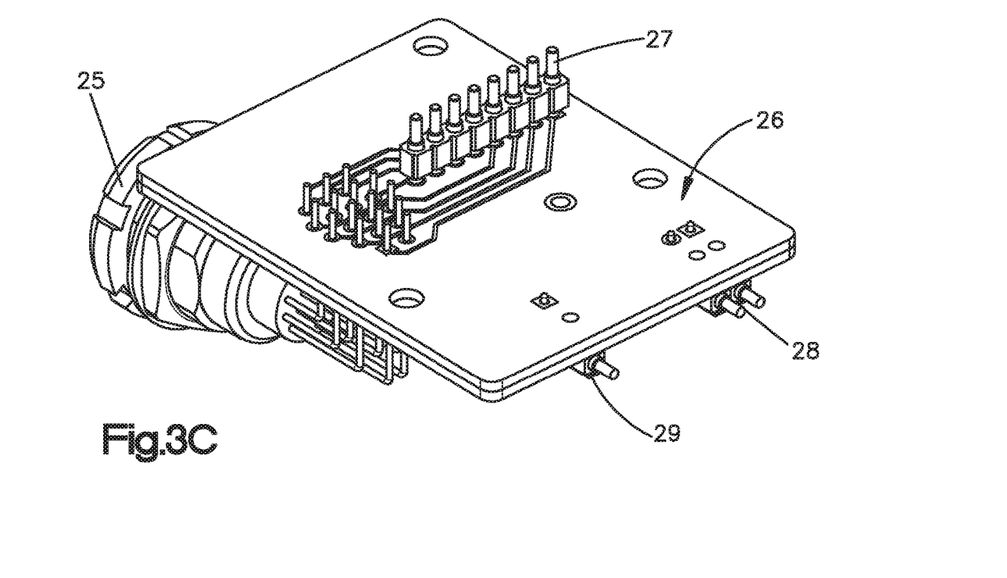
FIG. 3C is a top perspective view of a base printed circuit board connected to a base connector port of the platform of FIG. 1.
Figure 4A:
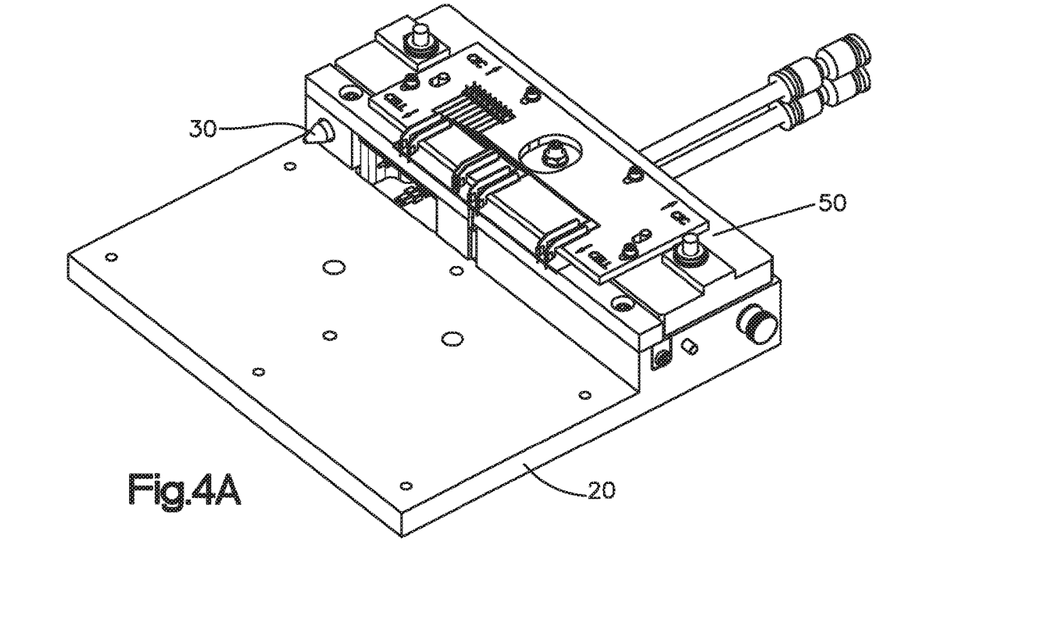
FIG. 4A is a top perspective view of a subassembly of the platform of FIG. 1, with the modular probe plate portion removed.
Figure 4B:
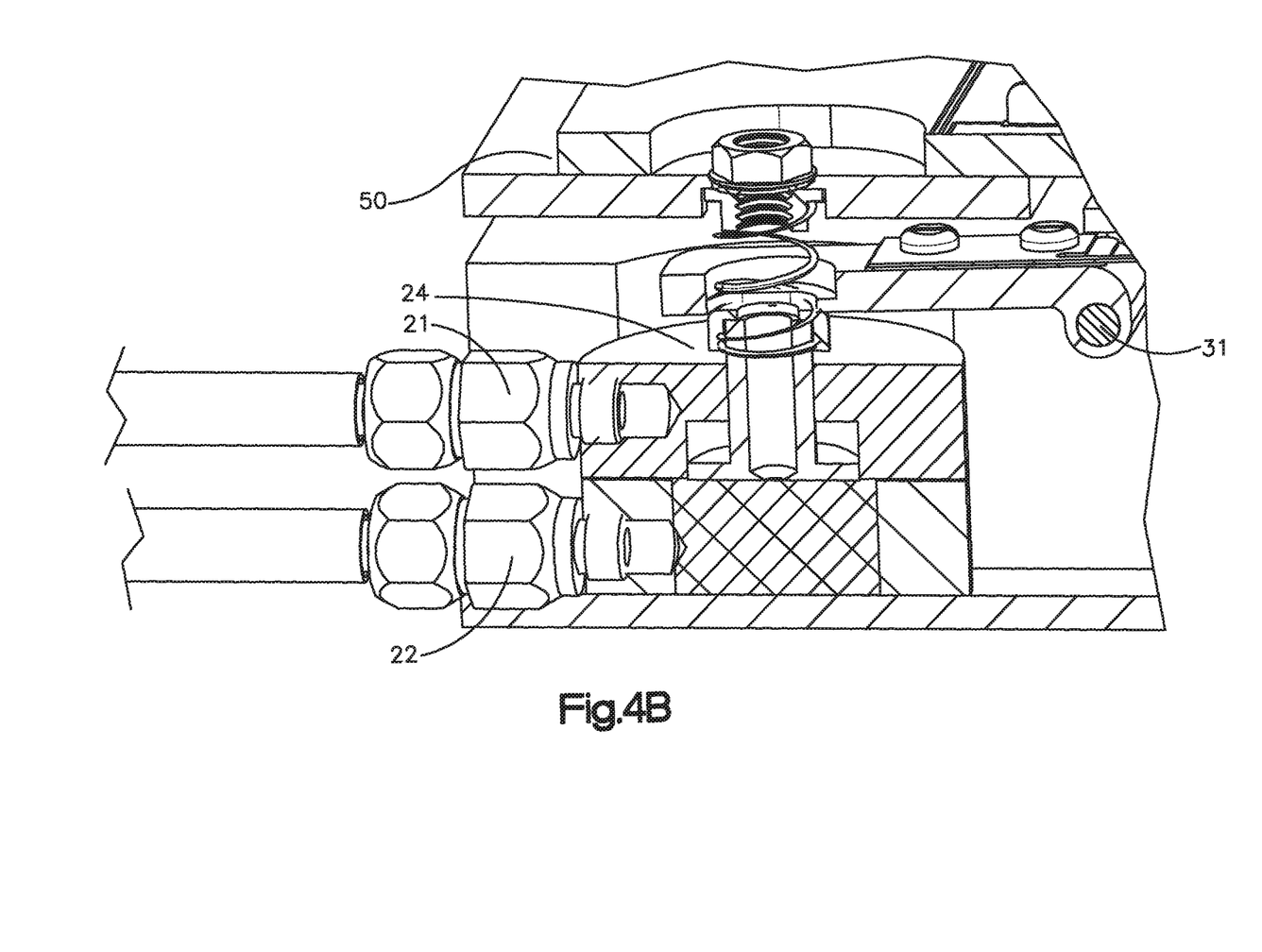
FIG. 4B is a cross-sectional view of a pneumatic vertical actuator subassembly of the platform of FIG. 4A.

As shown in FIGS. 3A, 3B, and 3C, a base printed circuit board 26 includes an electrical connection to the base connector port 25, and as shown in FIG. 2, is fixedly mounted atop the base 20. The probe card 50 and the probe plate 70 (FIG. 1) releasably connect to the exterior 23 of the base 20 (see also FIGS. 5A and 5B), with the probe card 50 engaging a portion of the pneumatic vertical actuator 24 such that motion of the pneumatic vertical actuator effects motion of the probe card 50 (FIGS. 4A and 4B). While FIG. 1 depicts one size solar cell 10, the probe plate 70 (FIG. 1) may be configured to receive a plurality of different-shaped solar cells for electrical performance testing under a variety of temperature and lighting conditions. In other examples, any one of the base 20, the probe card 50, and the probe plate 70 may be integrally formed with one another.

Figure 5A:
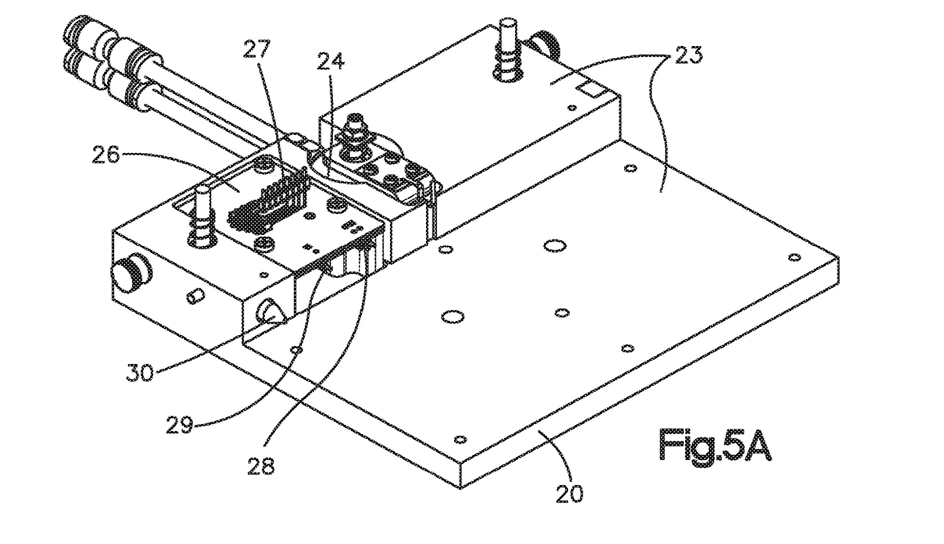
FIGS. 5A and 5B are top perspective views of a subassembly of the platform of FIG. 1, with the probe card and the modular probe plate portion removed.
Figure 5B:
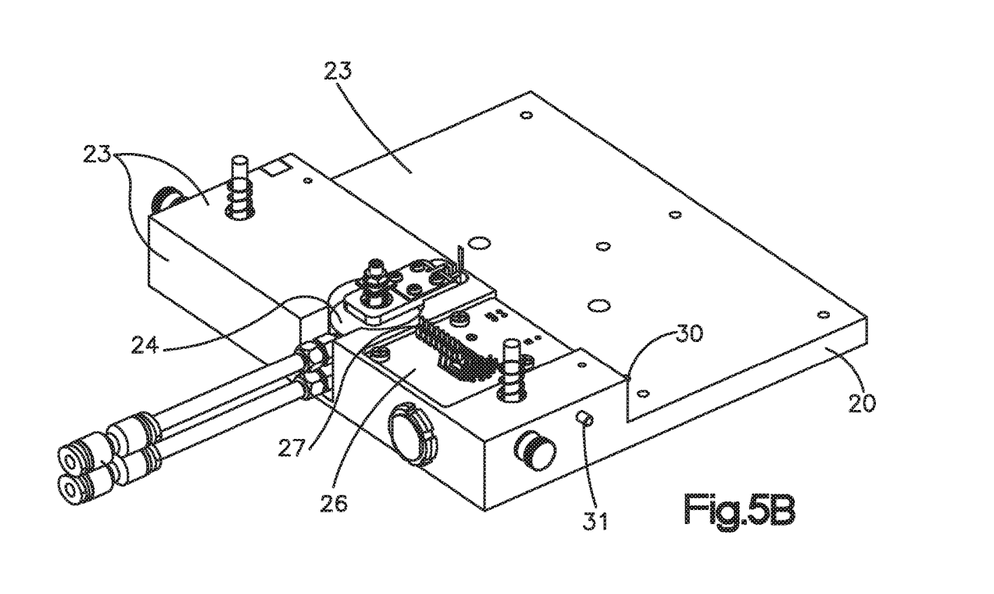
Figure 6A:
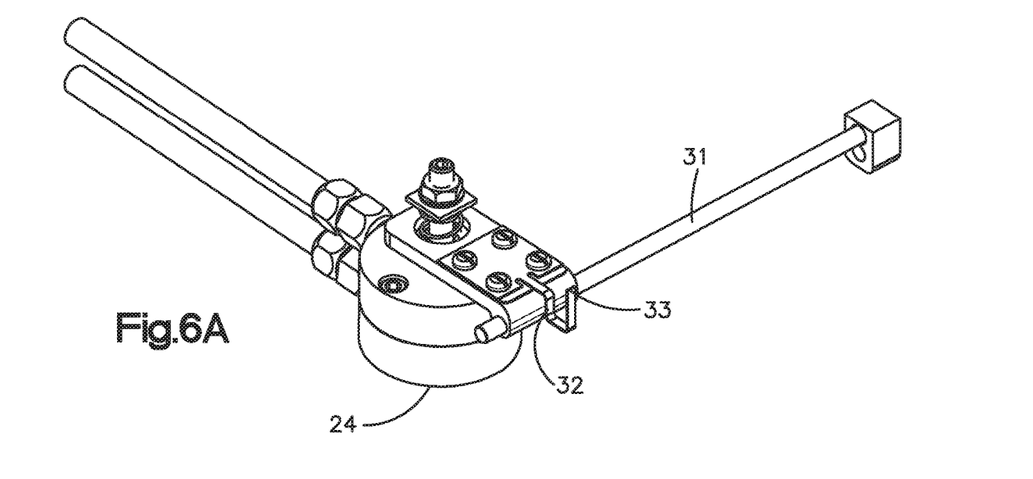
FIGS. 6A and 6B are top perspective views of a pneumatic vertical actuator subassembly of the platform of FIG. 1.
Figure 6B:
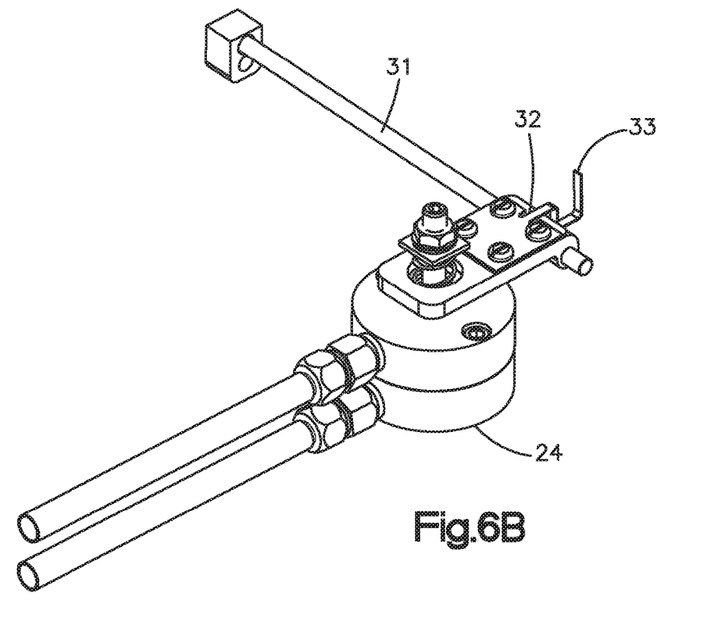

As shown in FIGS. 3A, 3B, and 3C, in examples, the base printed circuit board 26 includes a first current probe tip 29 and may include a set of male pins 27 and a pair of thermistor pogo pins 28. As shown in FIGS. 5A and 5B, the pair of thermistor pogo pins 28 and the first current probe tip 29 are disposed on the exterior 23 of the base 20. In examples, the base 20 includes an alignment pin 30 on the exterior 23 of the base. As shown in FIGS. 6A and 6B, the base 20 (FIG. 2) may house a voltage armature 32 connected to the pneumatic vertical actuator 24 and disposed against a horizontal pivot pin 31. A first voltage probe tip 33 is mounted to the voltage armature 32 in an arrangement whereby a downward movement of the pneumatic vertical actuator 24 effects an upward movement of the first voltage probe tip 33. The first voltage probe tip 33 is electrically connected to the base connector port 25 (FIG. 2).

Figure 7A:
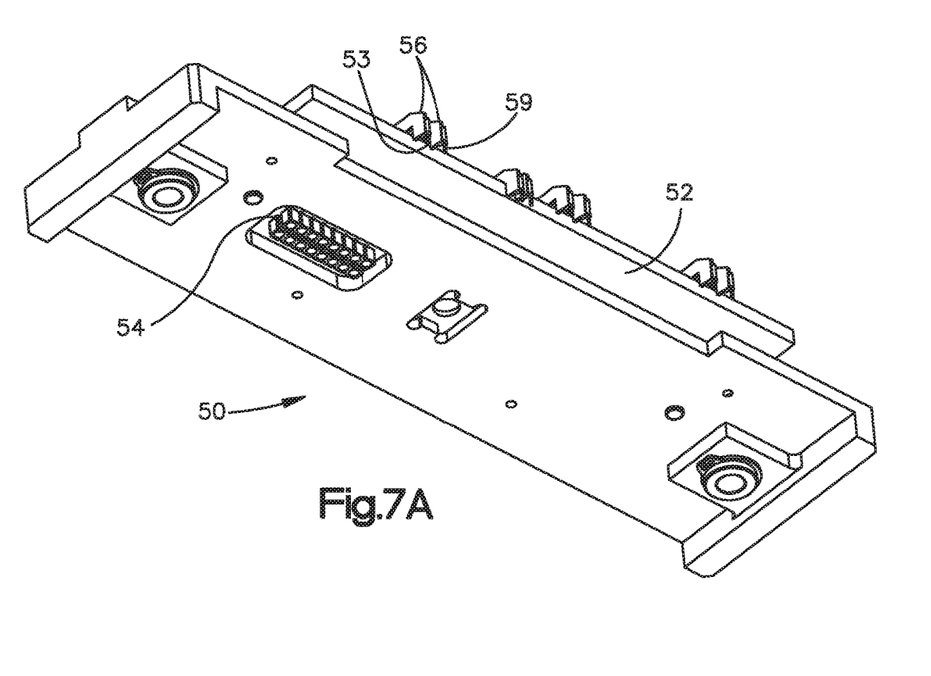
FIG. 7A is a bottom perspective view of a probe card subassembly of the platform of FIG. 1.
Figure 7B:
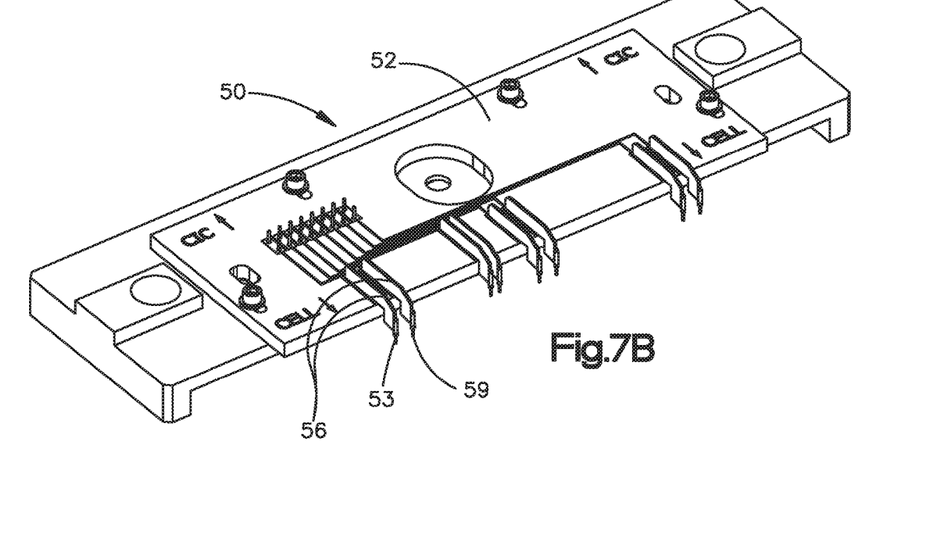
FIG. 7B is a top perspective view of the probe card subassembly of FIG. 7A.
Figure 7C:
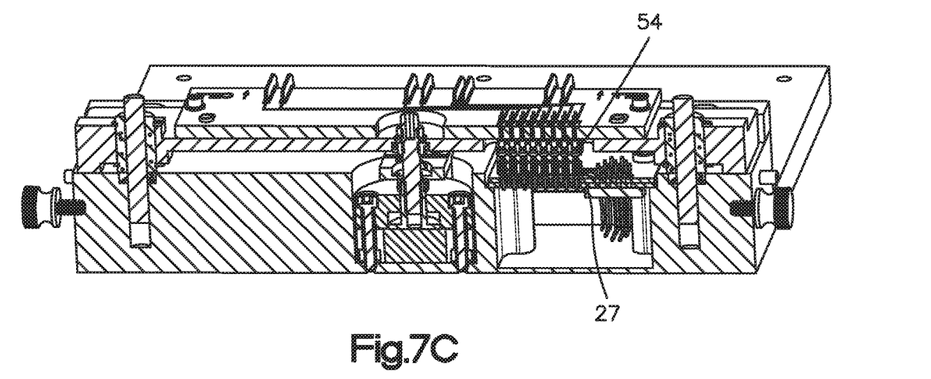
FIG. 7C is a cross-sectional view of a pneumatic vertical actuator subassembly and probe card subassembly of the platform of FIG. 1.

As shown in FIGS. 7A, 7B, and 7C, the probe card 50 may include a card printed circuit board 52 having a set of female pins 54 configured to align with the set of male pins 27 on the base printed circuit board 26 (FIG. 3C). As shown in FIG. 7B, at least one pair of armatures 56 is connected to the card printed circuit board 52, wherein the pair of armatures may vertically position a pair of pogo pins, which may take the form of a second voltage probe tip 53 and a second current probe tip 59. As shown in FIG. 1, electrical testing of the solar cell 10 can commence whereby upon placement of the solar cell on the probe plate 70, movement of the pneumatic vertical actuator 24 initiates electrical contact with the solar cell 10. At least two voltage contacts are made with the solar cell 10, one from below by the first voltage probe tip 33 (FIGS. 6A and 6B) and at least one from above by the second voltage probe tip 53. At least two current contacts are made with the solar cell 10: one is initiated from below by a the first current probe tip 29 (FIGS. 3A-3C), and at least one from above by the second current probe tip 59.

Figure 8A:
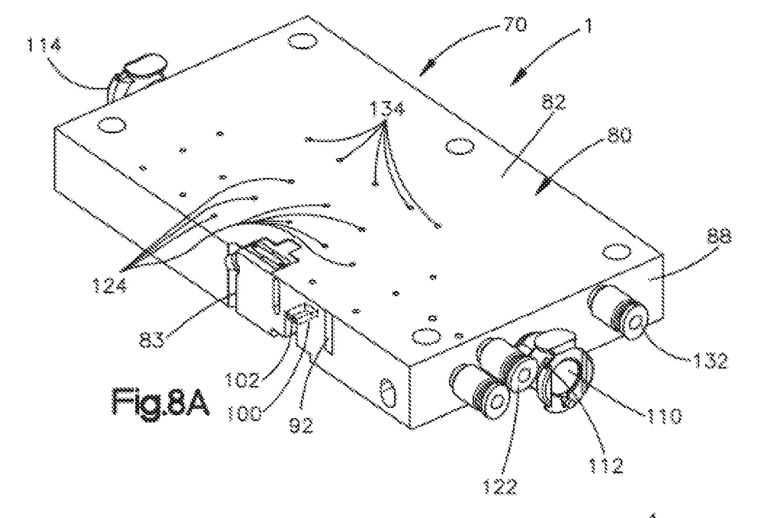
FIG. 8A is a top perspective view of a modular probe plate subassembly of the disclosed temperature controlled platform for holding, probing, and testing solar cells.
Figure 8B:
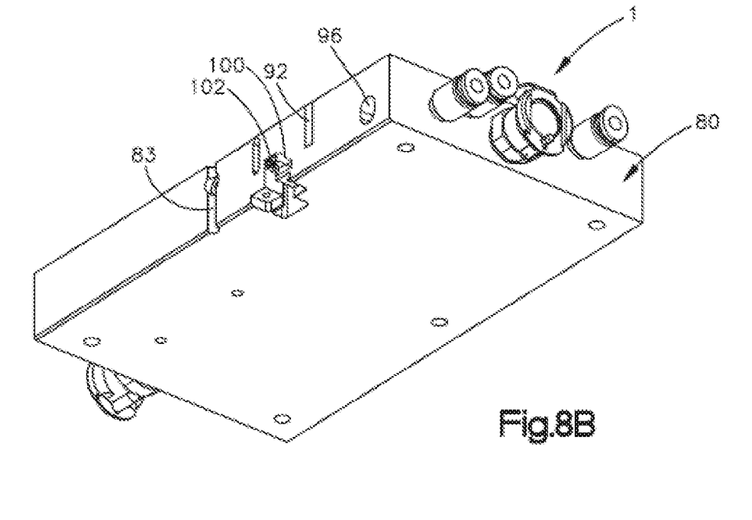
FIG. 8B is a bottom perspective view of the modular probe plate subassembly of FIG. 8A.
Figure 8C:
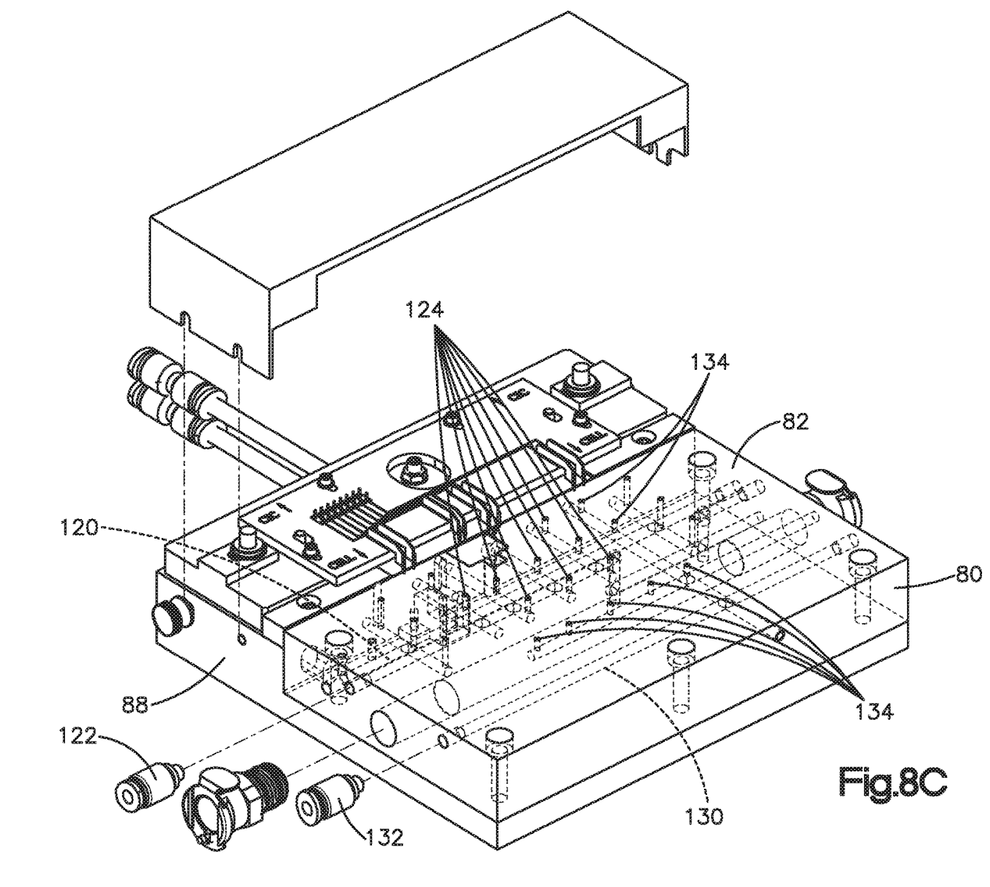
FIG. 8C is an exploded, top perspective view of the platform of the example of the disclosed temperature controlled platform for holding, probing, and testing solar cells of FIG. 8A.

As shown in FIGS. 8A, 8B, and 8C, an example of the probe plate 70 may include a housing 80 having electrical contacts 102 (shown in FIG. 9A) that connect to a temperature sensor 100 (shown with dashed lines in FIGS. 8A, 8B, and 9A) embedded into the housing 80, and a coolant channel 110 disposed within the housing. The coolant channel 110 includes a coolant channel input 112 on the input side surface 88 of the housing 80 and a coolant channel output 114 on the output side surface 89 of the housing. In such an example, the coolant channel 110 is filled with water, antifreeze, or other coolant fluids known to those skilled in the art. In this example, the probe plate 70 contains a first vacuum channel 120 within the housing 80 having a first vacuum input 122 on the input side surface 88 and a first series of unthreaded vacuum ports 124 on the conductive top surface 82. In prior art systems such vacuum ports were threaded to permit interchangeable plugging of ports that would not be covered by PVCs of smaller sizes. The metal burrs that would come off of such threaded ports would often cause damage to the surfaces of PVCs. The present disclosure no longer requires threaded ports because it dynamically adjusts to which vacuum ports have pressure applied based on the size of PVC presented.

The probe plate 70 also contains a second vacuum channel 130 within the housing 80, a second vacuum input 132 on the input side surface 88, and a second series of unthreaded vacuum ports 134 on the conductive top surface 82. FIG. 8A illustrates that the first series of unthreaded vacuum ports 124 and the second series of unthreaded vacuum ports 134 can be arranged in relation to one another so that a first-sized solar cell placed upon the conductive top surface 82 only abuts the first series of unthreaded vacuum ports 124, and a second-sized solar cell placed upon the conductive top surface 82 abuts both the first series of unthreaded vacuum ports 124 and the second series of unthreaded vacuum ports 134, wherein the second-sized solar cell is closer in size to the conductive top surface 82 than the first-sized solar cell in relation to the conductive top surface 82. Thus, when the second-sized solar cell is placed upon the conductive top surface 82, as opposed to when the first-sized solar cell is placed upon the conductive top surface 82, vacuum is applied to the second series of unthreaded vacuum ports 134 because the system can sense that they are covered. In an example, conductive top surface 82 is substantially covered by a conductive material, such as gold plating, to a degree that permits the solar cell underside 12 (not shown) to have sufficient contact with conductive top surface 82 for current conduction that is safe and efficient. In this example, solar cell underside 12 is configured for substantial contact with the conductive top surface 82, which is in turn conductively connected to a first housing contact 92.

Figure 9A:
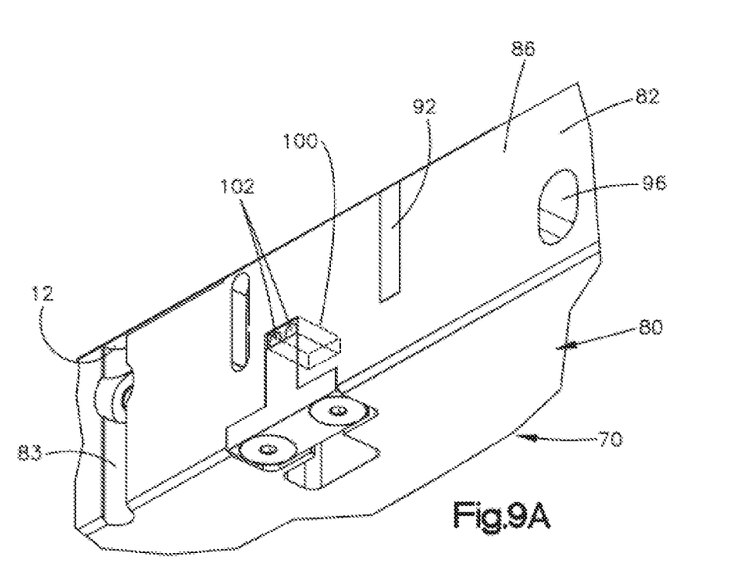
FIG. 9A is a detail perspective view of a modular probe plate of the disclosed temperature controlled platform for holding, probing, and testing solar cells.
Figure 9B:
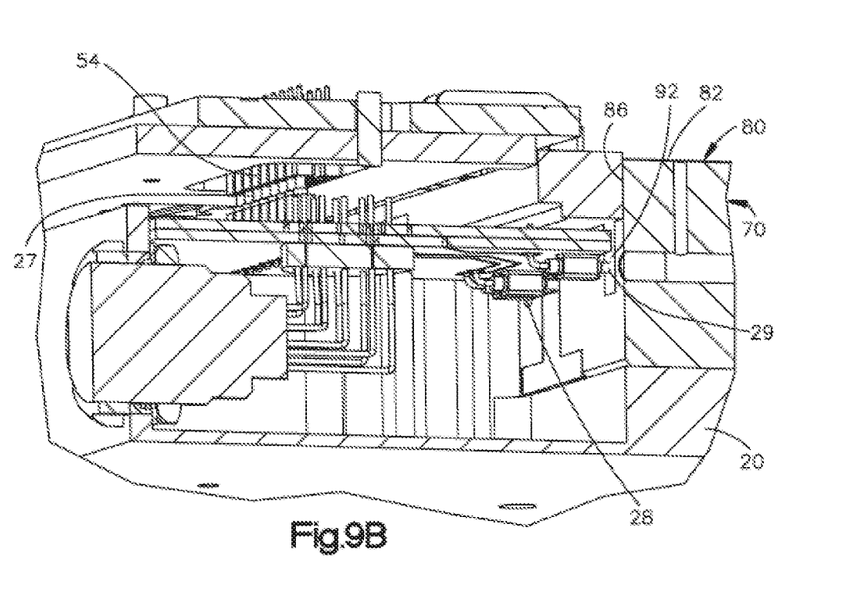
FIG. 9B is a detail cross-sectional view of the interface between the modular probe plate and the base printed circuit board subassembly of the platform of FIG. 9A.

As shown in FIGS. 9A and 9B, an example of the probe plate 70 may have the temperature sensor 100 integrated into the housing 80 and may include a pair of electrical contacts 102. The pair of electrical contacts 102 are configured to make contact with a pair of thermistor pogo pins 28. Upon connection between the probe plate 70 and the base 20, the first housing contact 92 is configured to come into contact with the first current probe tip 29, and an alignment hole 96 aligns with the alignment pin 30 (FIGS. 4A, 5A, and 5B). In a further example, each of the alignment hole 96, the first housing contact 92, and the pair of electrical contacts 102 is disposed on a side mating surface 86 of the conductive top surface 82. In a preferred example, the first housing contact 92 is disposed entirely on the exterior of the side mating surface 86. As seen in FIG. 9A, the side mating surface 86 is configured to include a voltage probe indent 83 to permit operation of the first voltage probe 33 as it makes contact with the solar cell underside 12.

Figure 10:
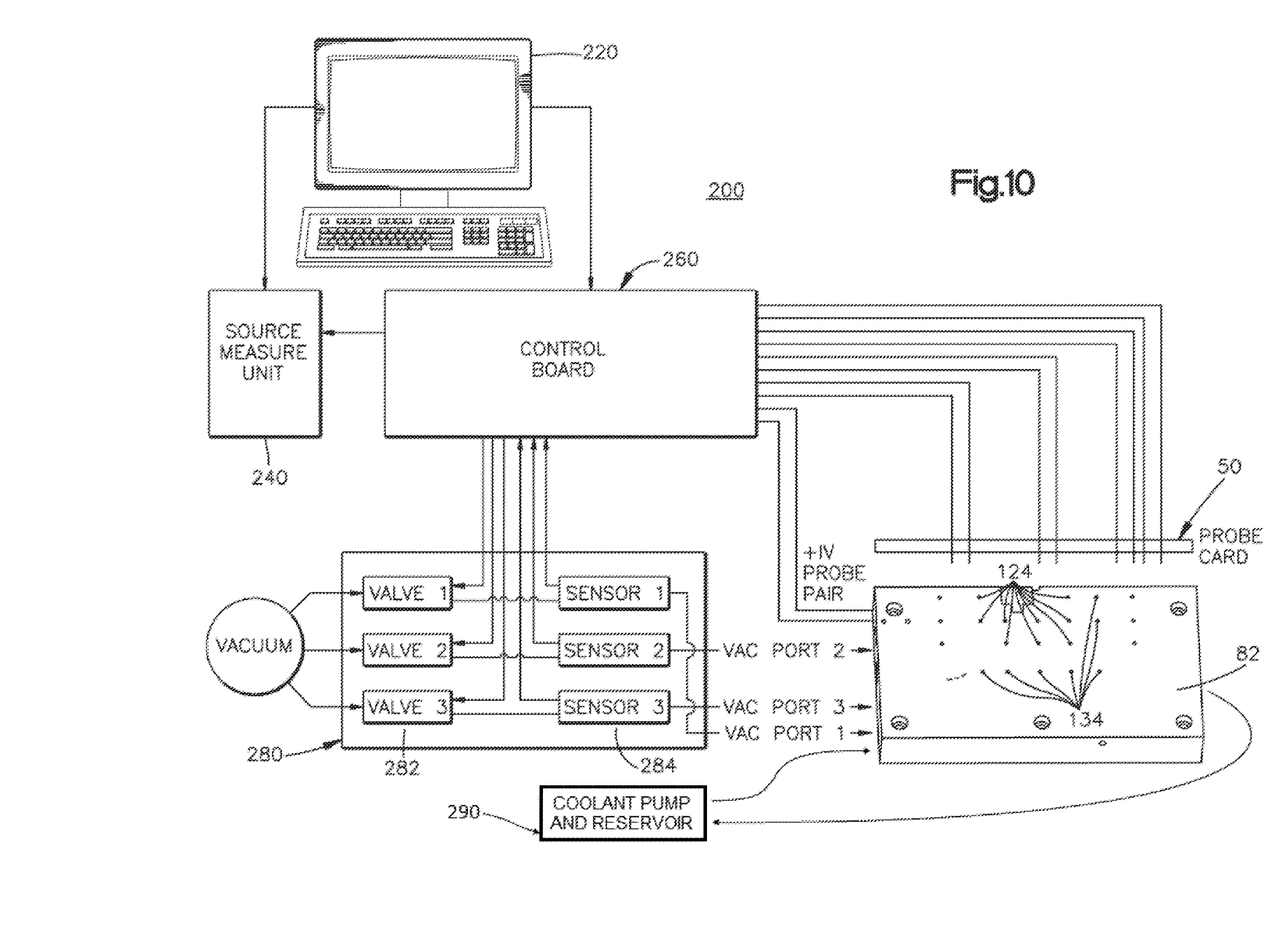
FIG. 10 is an electrical schematic of a system incorporating the examples of the temperature controlled platform for holding, probing, and testing solar cells of FIGS. 1-9A.

As shown in FIG. 10, in another example of the present disclosure, a system for testing solar cells 10, generally designated 200, includes a host computer 220, a source meter 240 connected to the host computer 220, a control board 260 connected to the host computer 220 and the source meter 240, and a platform 1 connected to the control board 260 and the pressure-vacuum valve-sensor unit 280. The control board 260 includes a microprocessor 261, an analog-to-digital converter ("A-D Converter") 262, a plurality of switching relays 263, and a universal serial bus interface ("USB Interface") 264. The system 200 further includes a pressure-vacuum valve-sensor unit 280 connected to the control board 260, having a series of valves 282 and sensors 284 capable of monitoring and controlling pressure.

The pressure-vacuum valve-sensor unit 280 within the system 200 measures for vacuum in a first series of unthreaded vacuum ports 124 and a second series of unthreaded vacuum ports 134. In an example, a solar cell having a first shape covers only the first series of unthreaded vacuum ports 124 when placed on the top surface 82 of the housing 80 of the probe plate 70. And, a solar cell having a second shape (which can be a different size and/or shape from the first shape) covers both the first series of unthreaded vacuum ports 124 and the second series of unthreaded vacuum ports 134 when placed on the top surface 82 of the housing 80 of the probe plate 70. Following the placement of a second sized solar cell on the top surface 82 of the housing 80 of the probe plate 70, the pressure-vacuum valve-sensor unit 280 in the system 200 activates the second series of unthreaded vacuum ports 134. Then, after removal of the second sized solar cell, and following placement of a first sized solar cell on the top surface 82 of the probe plate 70 housing 80, the pressure-vacuum valve-sensor unit 280 deactivates the second series of unthreaded vacuum ports 134.

The control board 260 activates the pressure-vacuum valve-sensor unit 280 to adjust pressure between the first pressure port 21 and the second pressure port 22, causing at least one pair of pogo pins 53 and 59 (FIGS. 7A and 7B) to contact the leads on a corresponding solar cell and causing the first voltage probe tip 33 (FIGS. 6A and 6B) to contact the solar cell 10 (FIG. 1) from underneath. The control board 260 measures continuity for corresponding pairs of probe tips 33 to ensure resistance is below a set threshold based on individual testing parameters.

The control board 260 may control operation of the coolant pump and reservoir 290 which may circulate coolant through the probe plate 70 and may be connected to the coolant channel input 112 and the coolant channel output 114. The control board 260 measures the temperature of the probe plate 70 and routes current and voltage signals to the source meter 240 to perform a Kelvin measurement. The control board 260 sends temperature data to the host computer 220.

Figure 11:
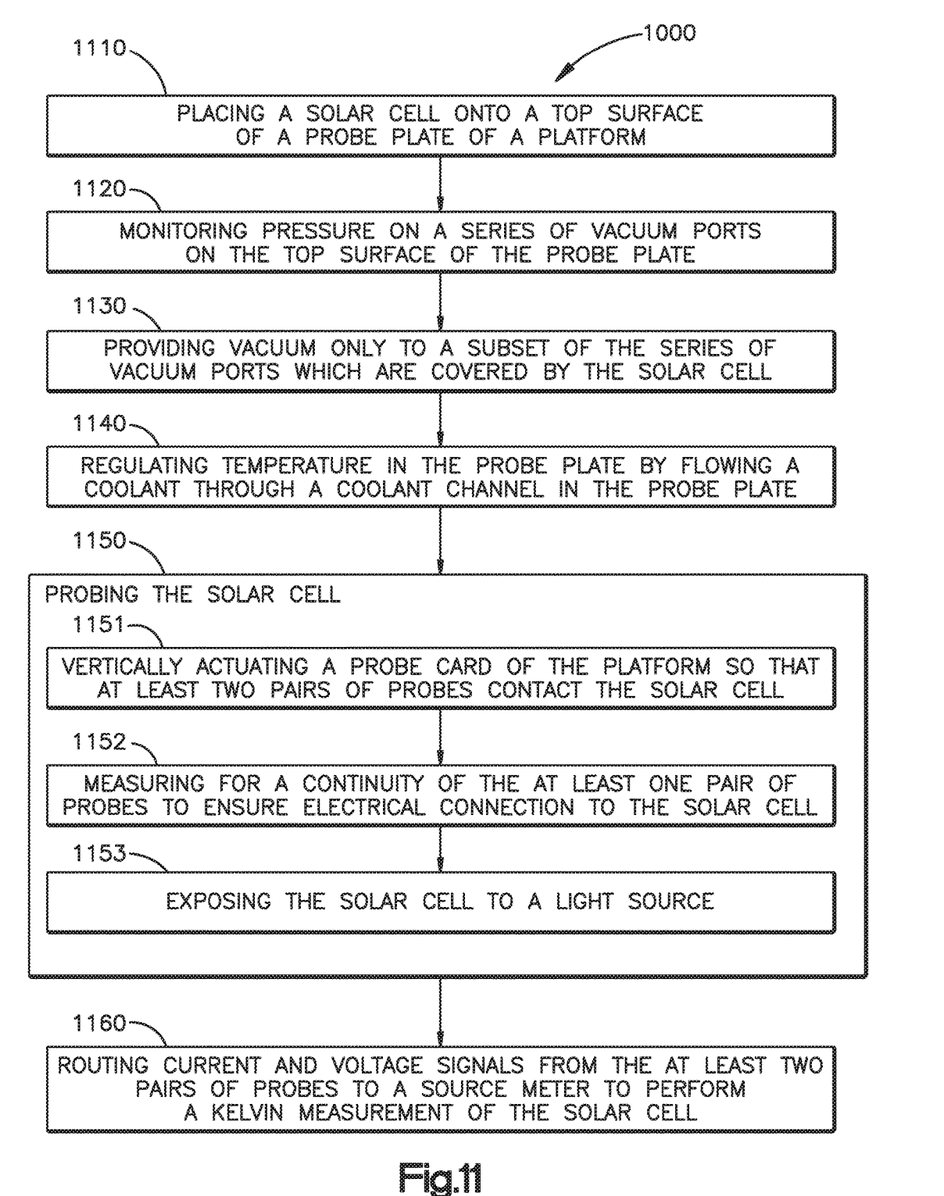
FIG. 11 is a flow diagram illustrating describing a method for the temperature controlled holding, probing, and testing of solar cells.

FIG. 11, shows a temperature-controlled method for holding, probing, and testing solar cells, generally designated 1000, utilizing the platform 1 shown in FIGS. 1-10 and described herein. As shown in block 1110, the method begins with the placement a solar cell 10 onto the top surface 82 of the probe plate 70 of the platform 1. In block 1120, the pressure on a series of vacuum ports 124, 134 on the top surface 82 is monitored by the sensor unit 280. In block 1130, vacuum is only provided to a subset of the series of vacuum ports 124 that are covered by the solar cell 10 by an external source (not shown). In block 1140, the temperature of the probe plate 70 is regulated by flowing a coolant through a coolant channel 110 in the probe plate 70 by means of, for example a pump or conventional coolant system (not shown). Next, as shown in block 1150, the solar cell 10 is probed by vertically actuating the probe card 50 of the platform 1, shown in block 1151, so that at least one pair of probes of the probe card 50 contact the solar cell 10, continuity of at least one pair of probes is measured to ensure electrical connection to the solar cell 10, as shown in block 1152, and in block 1153, the solar cell 10 is then exposed to a light source (not shown). As shown in block 1160, the current and voltage signals from at least one pair of probes of the probe card 50 is routed to a source meter 240 to perform a Kelvin measurement of the solar cell 10. For example, the light source that is exposed to the solar cell may be any suitable form of electromagnetic radiation, such as in part or in whole from the Sun, an incandescent lamp, a fluorescent lamp, a light emitting diode, or a solar simulator.

The solar simulator may be a light source, or more generically, an electromagnetic radiation source, that directs an artificially generated beam of concentrated illumination at a solar cell. For example, a solar simulator may illuminate a solar cell with concentrated illumination matched to American Society for Testing Materials (ASTM) Air Mass 1.5 D spectra in the intensity range 40 to 120 W/cmw (500 to 1300 Suns). Standard reference spectra, including AM0, AM1.5, and AM2 are described in ASTM G-173-03 available from ASTM International, West Conshohocken, Pa.

As disclosed in the foregoing, the PVC testing system and method of the present disclosure may utilize platforms configured to secure PVCs of varying sizes for safe, reliable, and efficient testing. While the following discussion describes various examples of the disclosed system and method as automatically adaptable to PVCs of many shapes and sizes, it is to be understood that the platform of the present disclosure may comprise interchangeable probe plates and/or interchangeable probe cards, such that the disclosed system and method is compatible with a variety of PVCs with minimal degrees of manual reconfiguration. From the foregoing, it will be appreciated that specific examples of the disclosure have been described herein for purposes of illustration, but that various modifications may be made without deviating from the disclosure. Aspects of the disclosure described in the context of particular examples may be combined or eliminated in other examples. Further, while advantages associated with certain examples of the disclosure have been described in the context of those examples, other examples may also exhibit such advantages, and not all examples need necessarily exhibit such advantages to fall within the scope of the disclosure. Accordingly, the disclosure is not limited except as by the appended claims.

What is claimed is:

1. A temperature controlled system for holding, probing, and testing solar cells, the system comprising:
- a probe plate portion including
  - a conductive top surface configured for contact with a solar cell underside;
  - a first series of vacuum ports disposed on the conductive top surface;
  - a second series of vacuum ports disposed on the conductive top surface, wherein the second series of vacuum ports cover a larger area of the conductive top surface than the area covered by the first series of vacuum ports; and
  - a coolant channel;
- a first voltage probe tip;
- a first current probe tip in contact with the conductive top surface;
- at least one second voltage probe tip;
- at least one second current probe tip; and
- a vertical actuator for causing the first voltage probe tip to contact the solar cell underside, and for causing the at least one second voltage probe tip and at least one second current probe tip to contact a solar cell top surface.

2. The system of claim 1, wherein the vertical actuator is a pneumatic vertical actuator.

3. The system of claim 2, further comprising:
a base including
a first pressure port;
a second pressure port, wherein the pneumatic vertical actuator is in fluid communication with the first pressure port and the second pressure port;
a base connector port; and
a base printed circuit board connected to the base connector port;
a probe card configured to releasably connect to the base, wherein the probe card is engaged with a portion of the pneumatic vertical actuator; and
wherein the probe plate portion is configured to releasably connect to the base and receive a plurality of different shaped solar cells.

4. The system of claim 3, wherein the base printed circuit board includes the first current probe tip, and further comprises:
a set of male pins; and
a pair of thermistor pogo pins.

5. The system of claim 4, wherein the base further comprises:
an alignment pin;
a horizontal pivot pin;
a voltage armature connected to the pneumatic vertical actuator and disposed against the horizontal pivot pin; and
wherein the first voltage probe tip is mounted to the voltage armature in an arrangement whereby a downward movement of the pneumatic vertical actuator is accompanied by an upward movement of the first voltage probe tip, and the first voltage probe tip is electrically connected to the base connector port.

6. The system of claim 5, wherein the probe card further comprises:
a card printed circuit board including a set of female pins configured to align with the set of male pins;
at least one pair of armatures connected to the card printed circuit board; and
at least one pair of pogo pins connected to the card printed circuit board by the at least one pair of armatures that vertically position the at least one pair of pogo pins.

7. The system of claim 5, wherein the probe plate portion further comprises:
a housing including contacts configured to contact the first voltage probe tip and the first current probe tip;
a temperature sensor integrated into the housing;
a coolant channel input; and
a coolant channel output.

8. The system of claim 7, wherein the probe plate portion further comprises:
a first vacuum channel having a first vacuum input connected to the first series of vacuum ports;
a second vacuum channel having a second vacuum input connected to the second series of vacuum ports; and
wherein the first series of vacuum ports and the second series of vacuum ports are arranged in relation to one another so that a solar cell having a first shape and being placed upon the conductive top surface only abuts the first series of vacuum ports, and a solar cell having a second shape which can be a different size and/or a different shape from the first shape and being placed upon the conductive top surface abuts both the first series of vacuum ports and the second series of vacuum ports, wherein the second shape is closer in size to the conductive top surface than the first shape in relation to the conductive top surface.

9. The system of claim 4, wherein the temperature sensor further comprises:
a pair of electrical contacts configured to make contact with the pair of thermistor pogo pins.

10. The system of claim 1 further comprising:
a source meter configured to be connected to a host computer;
a control board connected to the host computer and the source meter, wherein the control board comprises;
a microprocessor;
an analog to digital converter;
a plurality of switching relays; and
a universal serial bus interface;
a pressure-vacuum valve-sensor unit connected to the control board and having a series of valves and sensors capable of monitoring and controlling pressure;
a coolant pump and reservoir connected to the control board and having an input and output;
a platform connected to the control board, the pressure-vacuum valve-sensor unit, and the coolant pump and reservoir;
wherein the pressure-vacuum valve-sensor unit measures for vacuum in a first series of vacuum ports and a second series of vacuum ports, and following placement of a second sized solar cell on the conductive top surface the pressure-vacuum valve-sensor unit activates the second series of vacuum ports, and following placement of a first sized solar cell on the conductive top surface the pressure-vacuum valve-sensor unit deactivates the second series of vacuum ports;
wherein the control board activates the pressure-vacuum valve-sensor unit to adjust pressure between a first pressure port and a second pressure port causing at least one pair of pogo pins to contact corresponding solar cell leads and causing a first voltage probe tip to contact the solar cell from underneath, the control board measures continuity for each of a pair of probe tips and pogo pins to ensure resistance is below a set threshold; and
wherein the control board measures a probe plate temperature, the control board routes current and voltage signals to the source meter to perform a Kelvin measurement, and the control board sends temperature data to the host computer.

11. A method for the testing solar cells, the method comprising:
placing a solar cell onto a conductive top surface of a probe plate of a platform;
monitoring pressure on a series of vacuum ports formed on the conductive top surface of the probe plate;
providing vacuum only to a subset of the series of vacuum ports which are covered by the solar cell;
regulating temperature in the probe plate by flowing a coolant through a coolant channel in the probe plate;
probing the solar cell, the probing comprising;
vertically actuating a probe card of the platform so that at least two pairs of probes contact the solar cell;
measuring for a continuity of the at least one pair of probes to ensure electrical connection to the solar cell;
exposing the solar cell to a light source; and routing current and voltage signals from the at least two pairs of probes to a source meter to perform a Kelvin measurement of the solar cell.

12. The method of claim 11, wherein vertically actuating a probe card is driven by a pneumatic vertical actuator.

13. The method of claim 11, wherein the coolant used in regulating temperature in the probe plate is water, ethylene glycol, or propylene glycol.

14. The method of claim 12, wherein vertically actuating a probe card includes engaging the probe card with a portion of the pneumatic vertical actuator base.

15. The method of claim 12, wherein vertically actuating a probe card includes downwardly moving the pneumatic vertical actuator while simultaneously upwardly moving a first voltage probe tip.

16. The method of claim 15, wherein probing the solar cell requires that a first voltage probe tip is electrically connected to a base connector port.

17. The method of claim 16, wherein the vertically actuating probe card further comprises:
 a card printed circuit board including a set of female pins configured to align with the set of male pins;
 at least one pair of armatures connected to the card printed circuit board; and
 at least one pair of pogo pins connected to the card printed circuit board by the at least one pair of armatures that vertically position the at least one pair of pogo pins.

18. The method of claim 17, wherein regulating temperature in the probe plate is accomplished by a first series of vacuum ports and a second series of vacuum ports that are arranged in relation to one another so that a first sized solar cell placed upon the probe plate only abuts the first series of vacuum ports, and a second sized solar cell placed upon the probe plate abuts both the first series of vacuum ports and the second series of vacuum ports, wherein the second sized solar cell is closer in size to a conductive top surface of the probe plate than the first sized solar cell in relation to the conductive top surface.

19. The method of claim 11, wherein exposing the solar cell requires that the light source is selected from the group consisting of the Sun, an incandescent lamp, a fluorescent lamp, a light emitting diode, and a solar simulator.

20. A method for making a solar cell test system, the method comprising:
 forming a platform with a probe plate having a conductive top surface shaped to receive a solar cell thereon;
 forming a series of vacuum ports on the conductive top surface for monitoring pressure;
 programming a controller to provide a vacuum only to a subset of the series of vacuum ports that are covered by the solar cell;
 programming the controller to regulate temperature in the probe plate by flowing a coolant through a coolant channel formed in the probe plate;
 programming the controller to probe the solar cell by vertically actuating a probe card of the platform so that at least two pairs of probes contact the solar cell;
 measuring for a continuity of the at least one pair of probes to ensure electrical connection to the solar cell;
 exposing the solar cell to a light source; and
 routing current and voltage signals from the at least two pairs of probes to a source meter to perform a Kelvin measurement of the solar cell.

* * * * *